(12) United States Patent
Yoo (10) Patent No.: US 10,343,072 B2
(45) Date of Patent: Jul. 9, 2019

(54) APPARATUS AND METHOD OF PRODUCING RHYTHM GAME, AND NON-TRANSITORY COMPUTER READABLE MEDIUM

(71) Applicants: LINE Up Corporation, Seongnam-si, Gyeonggi-do (KR); LINE Studio Corporation, Seongnam-si, Gyeonggi-do (KR)

(72) Inventor: Myoung Geun Yoo, Seongnam-si (KR)

(73) Assignees: Line Up Corporation, Seongnam-si (KR); Line Studio Corporation, Seongnam-si (KR)

(*) Notice: Subject to any disclaimer, the term of this patent is extended or adjusted under 35 U.S.C. 154(b) by 223 days.

(21) Appl. No.: 14/824,201

(22) Filed: Aug. 12, 2015

(65) Prior Publication Data

US 2016/0175718 A1 Jun. 23, 2016

(30) Foreign Application Priority Data

Dec. 22, 2014 (KR) .......................... 10-2014-0186377

(51) Int. Cl.
*A63F 13/814* (2014.01)
*A63F 13/424* (2014.01)
*A63F 13/65* (2014.01)
*A63F 13/215* (2014.01)

(52) U.S. Cl.
CPC .......... *A63F 13/814* (2014.09); *A63F 13/424* (2014.09); *A63F 13/65* (2014.09); *A63F 13/215* (2014.09)

(58) Field of Classification Search
CPC ............ A63F 13/814; A63F 2300/6072; A63F 2300/8047
USPC ....................................... 463/35, 43
See application file for complete search history.

(56) References Cited

U.S. PATENT DOCUMENTS

| 2007/0265097 A1* | 11/2007 | Havukainen | A63F 13/10 463/43 |
| 2010/0035685 A1* | 2/2010 | Cha | A63F 13/10 463/35 |
| 2011/0081024 A1* | 4/2011 | Soulodre | G01S 3/8006 381/17 |
| 2011/0311060 A1 | 12/2011 | Kim et al. | |
| 2011/0311080 A1 | 12/2011 | Kim et al. | |

FOREIGN PATENT DOCUMENTS

| KR | 20090039537 A | 4/2009 |
| KR | 20100004667 A | 1/2010 |
| KR | 20110138530 A | 12/2011 |

* cited by examiner

*Primary Examiner* — David L Lewis
*Assistant Examiner* — Robert E Mosser
(74) *Attorney, Agent, or Firm* — Harness, Dickey & Pierce, P.L.C.

(57) ABSTRACT

Provided is a method of producing a rhythm game according to an embodiment of the inventive concepts that includes extracting a main sound source of a music signal by based on a plurality of channel signals included in the music signal; extracting a peak period from the main sound source; and designating a rhythm note that requires a tap input from a user to correspond to a timing of the peak period.

20 Claims, 5 Drawing Sheets

APPARATUS AND METHOD OF PRODUCING RHYTHM GAME, AND NON-TRANSITORY COMPUTER READABLE MEDIUM

CROSS-REFERENCE TO RELATED APPLICATION

This application claims the benefit of Korean Patent Application No. 10-2014-0186377, filed on Dec. 22, 2014, in the Korean Intellectual Property Office, the disclosure of which is incorporated herein in its entirety by reference.

BACKGROUND

1. Field

One or more example embodiments relate to an apparatus and a method of producing a rhythm game, and a computer program for executing the method thereof.

2. Description of the Related Art

A game service interfacing with music has been provided. In general, the game service interfacing with music provides a package of music and a game. In this regard, a service interfacing with music has an issue related to a copyright of music. As a result, the service has been provided based on a limited music source.

SUMMARY

One or more example embodiments include an apparatus and a method of producing a rhythm game, and/or a computer readable medium storing instructions for execution by a processor that cause the processor to perform the method thereof. In detail, one or more example embodiments include an apparatus, a method, and/or a computer readable medium for producing a rhythm game by using a music signal provided from a terminal of a user Additional aspects will be set forth in part in the description which follows and, in part, will be apparent from the description, or may be learned by practice of the presented embodiments.

According to one or more example embodiments, a method of producing a rhythm game includes extracting, by a processor, a main sound source of a music signal based on a a plurality of channel signals included in the music signal; extracting, by a processor, a peak period from the main sound source; and designating, by a processor, a rhythm note that requires a tap input from a user and corresponds to a timing of the peak period.

In some embodiments, in the extracting of the peak period, a period in which a volume of the main sound source exceeds a threshold value is extracted as the peak period.

In some embodiments, the main sound source includes at least one selected from a vocal sound source and a drum sound source.

In some embodiments, the music signal is a stereo signal including a left channel signal and a right channel signal; the main sound source includes a vocal sound source; and the extracting of the main sound source includes extracting the vocal sound source via a center channel extraction method.

In some embodiments, the rhythm note includes at least one selected from a single note requiring a single tap input, a sustain note requiring a long tap input and a combination thereof, the sustain note having a greater length than the single note.

In some embodiments, in the designating of the rhythm note, the sustain note is designated for a peak period when a length of the peak period is greater than a threshold length.

In some embodiments, in the designating of the rhythm note, the single note is designated for a peak period when a length of the peak period is less than or equals to a threshold length.

In some embodiments, the method further includes calculating, by a processor, a number of frequency components of the peak period extracted from the main sound source, wherein, the number of single notes designated in the designating of the rhythm note corresponds to the number of the frequency components of the peak period.

In some embodiments, the method further includes obtaining, by a processor, a music signal stored in a terminal of the user or obtaining a music signal via a network, before the extracting of the main sound source, wherein the extracting of the main sound source includes extracting the main sound source from the obtained music signal.

In some embodiments, the rhythm note is designated to be allocated to at least one of a plurality of lines and in correspondence to a timing of the peak period.

In some embodiments, the at least one of the plurality of lines is determined based on a desired order or a random order.

In some embodiments, in the designating of the rhythm note, the rhythm note is designated to be allocated to at least two of the plurality of lines and in correspondence with a timing of the peak period.

In some embodiments, the designating of the rhythm note includes designating the rhythm note to be allocated to different lines and in correspondence with successive peak periods.

According to one or more example embodiments, an apparatus for producing a rhythm game includes a memory having computer readable instructions stored thereon; at least one processor configured to execute the computer readable instructions to extract a main sound source of a music signal based on an analysis of the music signal; extract a peak period from the main sound source; and designate a rhythm note that requires a tap input from a user and corresponds to a timing of the peak period.

In some embodiments, the processor is configured to execute the computer readable instructions to further obtain a music signal stored in a terminal of the user or obtaining a music signal via a network, wherein the processor extracts a main sound source from the obtained music signal.

According to one or more example embodiments, provided is a non-transitory computer readable medium storing instructions that when executed by a computer, cause the computer to perform the method of producing a rhythm game.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Detailed example embodiments of the inventive concepts are disclosed herein. However, specific structural and functional details disclosed herein are merely representative for purposes of describing example embodiments of the inventive concepts. Example embodiments of the inventive concepts may, however, be embodied in many alternate forms and should not be construed as limited to only the embodiments set forth herein.

Accordingly, while example embodiments of the inventive concepts are capable of various modifications and alternative forms, embodiments thereof are shown by way of example in the drawings and will herein be described in detail. It should be understood, however, that there is no intent to limit example embodiments of the inventive concepts to the particular forms disclosed, but to the contrary, example embodiments of the inventive concepts are to cover all modifications, equivalents, and alternatives falling within the scope of example embodiments of the inventive concepts. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the inventive concepts. As used herein, the term "and/or" includes any and all combinations of one or more of the associated listed items.

The terminology used herein is for the purpose of describing particular embodiments only and is not intended to be limiting of example embodiments of the inventive concepts. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Figure 1:
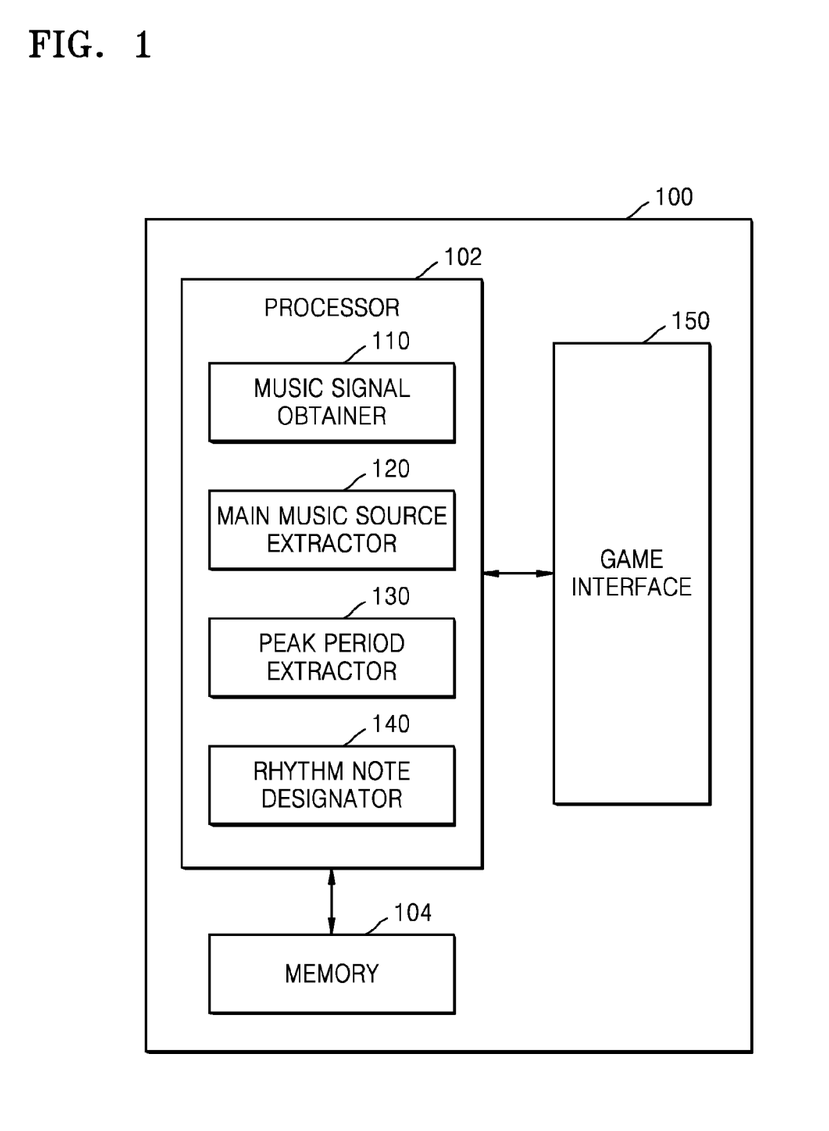
FIG. 1 is a schematic block diagram of a game providing apparatus 100 according to an embodiment of the inventive concepts.

FIG. 1 is a schematic block diagram of a game providing apparatus 100 according to an embodiment of the inventive concepts.

The game providing apparatus 100 according to an embodiment may be embodied in a portable computing device such as a smartphone, tablet, portable computer; a console, and etc. As such the game providing apparatus may be may be realized by hardware elements, at least one processor executing software elements, and/or combinations thereof. For example, the devices and components illustrated in the example embodiments of the inventive concepts may be implemented by processing circuitry such as a computer, a processor, a controller, an arithmetic logic unit (ALU), a digital signal processor, a microcomputer, a field programmable array (FPA), a programmable logic unit (PLU), a microprocessor or any device which may execute instructions and respond. A processing unit may implement an operating system (OS) or one or software applications running on the OS. Further, the processing unit may access, store, manipulate, process and generate data in response to execution of software. It will be understood by those skilled in the art that although a single processing unit may be illustrated for convenience of understanding, the processing unit may include a plurality of processing elements and/or a plurality of types of processing elements. For example, the processing unit may include a plurality of processors or one processor and one controller. Alternatively, the processing unit may have a different processing configuration, such as a parallel processor.

Software may include computer programs, codes, instructions or one or more combinations thereof and configure a processing unit to operate in a desired manner or independently or collectively control the processing unit. Software and/or data may be permanently or temporarily embodied in any type of machine, components, physical equipment, virtual equipment, computer storage media or units or transmitted signal waves to be interpreted by the processing unit or to provide instructions or data to the processing unit. Software may be dispersed throughout computer systems connected via networks and be stored or executed in a dispersion manner. Software and data may be recorded in one or more non-transitory computer-readable storage media.

The methods according to the above-described example embodiments of the inventive concepts may be implemented with program instructions which may be executed by various processing circuitry and may be recorded in computer-readable media. The non-transitory computer-readable media may also include, alone or in combination with the program instructions, data files, data structures, and the like. The program instructions recorded in the media may be designed and configured specially for the example embodiments of the inventive concepts or be known and available to those skilled in computer software. Computer-readable media may include magnetic media such as hard disks, floppy disks, and magnetic tape; optical media such as CD ROM disks and DVDs; magneto-optical media such as floptical disks; and hardware devices which are specially configured to store and perform program instructions, such as a read-only memory (ROM), a random access memory (RAM), a flash memory, and the like. Program instructions may include both machine codes, such as produced by a compiler, and higher-level language codes which may be executed by the computer using an interpreter. The described hardware devices may be configured to as one or more modules or units to perform the operations of the above-described example embodiments of the inventive concepts, or vice versa.

The game providing apparatus 100 in FIG. 1 only illustrates components related to the inventive concepts. It may be understood by a person of ordinary skill in the art that other general components may be further included herein, other than the components illustrated in FIG. 1.

Referring to FIG. 1, a game providing apparatus 100 according to an embodiment may provide a game interface to a terminal, smart phone, tablet, computer, etc. The game providing apparatus 100 according to an embodiment may analyze music to provide a game corresponding to the music. In detail, the game providing apparatus 100 according to an embodiment may analyze music to produce a rhythm game corresponding to the music. For example, the game providing apparatus 100 according to an embodiment may analyze music to produce a rhythm note corresponding to the music, and the rhythm note may be a game component requiring a tap input from a user.

The game providing apparatus 100 according to an embodiment may include one or more processors 102, a memory 104 connected to the one or more processors 102, and a game interface 150. The game interface 150 may be a touch screen, a display screen and mouse and/or keyboard, etc. The apparatus 100 may also include other interfaces such as a network interface, which interfaces the apparatus with a network such as the internet. The memory 104 stores computer readable instructions that when executed by the processor 102 configures the processor 102 as a special purpose machine to perform the operations of the rhythm game. For example, in one embodiment, the processor 102 may be configured to include a music signal obtainer 110, a main music source extractor 120, a peak period extractor 130, a rhythm note designator 140 and a game interface provider 150.

The music signal obtainer 110 according to an embodiment may obtain a music signal. The music signal obtainer 110 may obtain a music signal stored in a terminal, smart phone, tablet, computer etc. of a user (e.g., stored in memory 104) or obtain a music signal through a network (e.g., over the network). A music signal may be selected by a user. A music signal may include a plurality of channel signals. For example, a music signal may be a stereo signal including a left channel signal and a right channel signal. However, embodiments of the inventive concepts are not limited thereto.

The main music source extractor 120 according to an embodiment may analyze a music signal to extract a main sound source of the music signal.

A music signal may include a plurality of sound sources. Here, a sound source is different from a channel mentioned above. For example, a music signal may include a vocal sound source, a drum sound source, a guitar sound source, a base sound source, an electronic sound source, and the like. Each sound source may be extracted by using a sound source extracting method.

The main sound source according to an embodiment may refer to a specific sound source from among the sound sources mentioned above. The main music source extractor 120 may extract the main sound source to be a characteristic of a music signal so that a rhythm note, which is one of the game components, is generated. The main sound source may be a vocal sound source. Alternatively, the main sound source may be a drum sound source. Alternatively, the main sound source may include both a vocal sound source and a drum sound source. The main sound source may become a basic sound source to generate a rhythm game.

The main music source extractor 120 according to an embodiment may further extract a sub sound source, in addition to the main sound source. For example, a vocal sound source may be extracted as the main sound source, and a drum sound source may be extracted as the sub sound source.

The main music source extractor 120 may extract a vocal sound source. To this end, the main music source extractor 120 may use the well-known center channel extraction method for a stereo-type sound source. In the center channel extraction method, a sound source, which is not biased to any channel, is extracted from a music signal including a plurality of channels. In general, a musical instrument such as a guitar or a piano is recorded while being biased to a specific channel, but a sound source of a vocal is evenly distributed over a plurality of channels. In this regard, when extracting a sound source which is not biased to any channel, a vocal sound source may be extracted.

For example, when a music signal is a stereo-type, a common component included in both a left channel signal and a right channel signal may be extracted as a center sound source, and then the extracted center sound source may be determined as a main sound source. The center sound source may include, for example, a vocal sound source and a drum sound source.

However, embodiments of the inventive concepts are not limited thereto. In some embodiments, the main sound source may also be determined by extracting a component biased to a left channel signal as a left channel sound source, or extracting a component biased to a right channel signal as a right channel sound source. The left channel sound source or the right channel sound source may include, for example, a guitar sound source, a keyboard sound source, and a base guitar sound source.

According to an embodiment, any one selected from the above-mentioned center sound source, left channel sound source, and right channel sound source may be selected as the main sound source, and a criterion for the selection may be a volume of each sound source. For example, a sound source having the highest volume may be determined as the main sound source, and a sound source having the second-highest volume may be determined as the sub sound source.

The main music source extractor 120 may further perform separating a left channel signal and a right channel signal by using a plurality of channel signals.

The peak period extractor 130 according to an embodiment may extract a peak period from the main sound source. The peak period extractor 130 may extract the peak period based on a volume of the main sound source. For example, a period in which the volume of the main sound source exceeds a desired (or, a alternatively a predetermined) threshold value may be extracted as the peak period.

When the main sound source is a drum sound source, the peak period may be extracted for each of the drum beats. When the main sound source is a vocal sound source, the peak period may be extracted for each of the melody notes.

The peak period extractor 130 may extract a peak period of the sub sound source in the same manner for extracting the main sound source. When the peak period extractor 130 extracts the peak period of the sub sound source, a criterion for extracting the peak period of the sub sound source may be more strictly set than that of the main sound source. For example, a volume threshold value for extracting the peak period of the sub sound source may be set to be greater than that of the main sound source.

The rhythm note designator 140 according to an embodiment may designate a rhythm note to correspond to a timing of the peak period of the main sound source. A rhythm note is a game component to be displayed on a game screen and requires a tap input from a user at a desired (or, a alternatively a predetermined) timing.

The rhythm note may include a single note requiring a single tap, a sustain note requiring a long tap maintained for a period, or the like. The rhythm note may include any of a plurality of single notes, a combination of a single note and a sustain note, or a plurality of sustain notes.

The rhythm note designator 140 may determine a kind of the rhythm note based on a characteristic of the peak period. For example, when a length of the peak period is equal to or less than a criterion (e.g., desired duration), the rhythm note may be designated as a single note, and when the length of the peak period is greater than the criterion, the rhythm note may be designated as a sustain note. The timing of each of the notes may correspond to a timing of the peak period. For example, the single note may be designated as requiring a single tap input from a user at a time point when the peak period starts, and the sustain note may be designated as requiring a long tap input from a user from a time point when the peak period starts to a time point when the peak period ends.

The rhythm note designator 140 may designate a combination of the rhythm notes according to a characteristic of a frequency of the peak period. The rhythm note designator 140 may designate single notes based on the number of frequency components obtained from analyzing the frequency of the peak period. For example, when the number of frequency components of the peak period is two, the rhythm note designator 140 may designate two single notes for the same time point of the peak period together. In this regard, when a peak period of a vocal sound source includes a chord, the rhythm note designator 140 may designate single notes corresponding to the number of notes included in the chord.

The rhythm note designator 140 may designate a rhythm note to be allocated to any one of a plurality of lines. For example, a rhythm note may be allocated to any one of a plurality of lines, the rhythm note designator 140 may designate a rhythm note to be allocated to any one line of a plurality of lines to correspond to a timing of a peak period.

The rhythm note designator 140 may determine a line where a rhythm note is allocated for each peak period in a desired (or, a alternatively a predetermined) order. Alternatively, a line where a rhythm note is allocated may be selected from among a plurality of lines in a random manner. Also, the rhythm note designator 140 may, for example, designate a rhythm note to be allocated to different lines to correspond to successive peak periods, referring to a desired (or, a alternatively a predetermined) rule.

The rhythm note designator 140 may, of course, designate a rhythm note to be allocated to two or more lines from among a plurality of lines to correspond to a timing of each peak period.

When the main sound sources are plural, the rhythm note designator 140 may designate a line of a rhythm note to be allocated to each sound source. For example, a rhythm note for a first line may be designated to correspond to the peak period of a vocal sound source, and a rhythm note for a second line may be designated to correspond to the peak period of a drum sound source.

When the sub sound source exits, the rhythm note designator 140 may designate a line of a rhythm note to be allocated to the sub sound source. The rhythm note designator 140 may designate a line of a rhythm note to be allocated to each of the main sound source and the sound source.

The rhythm note designator 140 may store information on rhythm notes designated to be allocated to entire music signals as a rhythm game file.

After a rhythm note is designated to be allocated to the peak period, the rhythm note designator 140 may provide an interface on the game interface 150 through which a user may edit the rhythm note before the designated note is stored. For example, the rhythm note designator 140 may display the designated rhythm note on a touch screen, and may also display a tool with which a user may edit the rhythm note. A user may delete some portions of a rhythm note, or add or modify a rhythm note, and then the rhythm note designator 140 may store a final version of a rhythm game file taking into account modifications from a user.

The game interface 150 according to an embodiment may provide a game environment. The game interface provider 150 may display a rhythm note on a screen (e.g., a touch screen) to correspond to a timing of each peak period while reproducing a music signal. The game interface provider 150 may display a rhythm note to correspond to a desired (or, a alternatively a predetermined) timing, and may receive a tap for each rhythm note from a user and then convert the tap into a score. A user may input a tap signal to correspond to a rhythm note by taping on the touch screen, pressing a button on the keyboard, etc.

Figure 2:
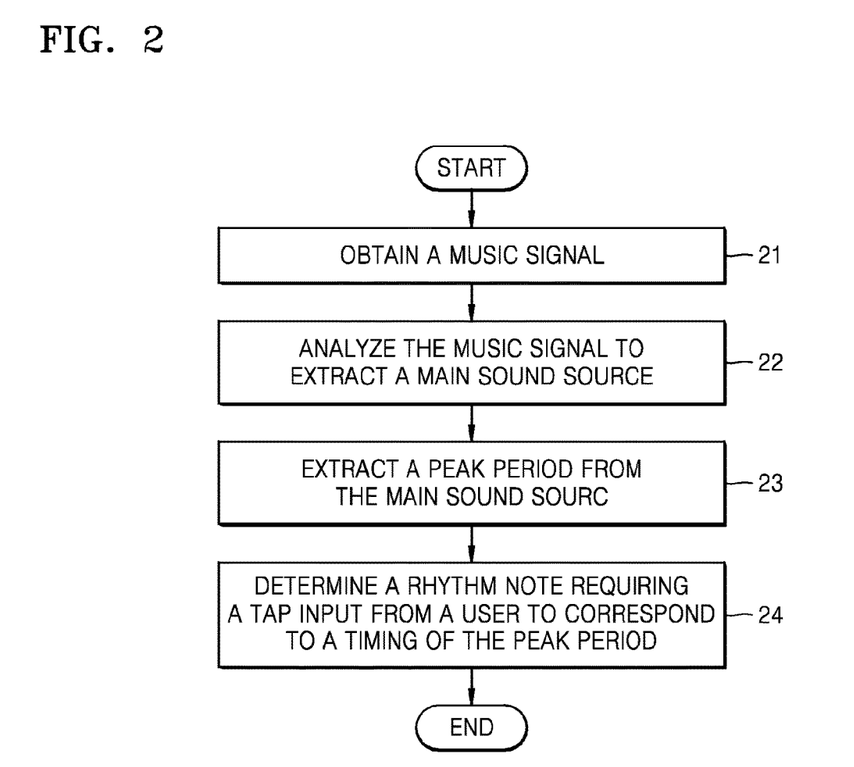
FIG. 2 is a flow chart showing a method of providing a rhythm game according to an embodiment.

FIG. 2 is a flow chart showing a method of providing a rhythm game according to an embodiment.

FIG. 2 illustrates operations sequentially performed in the rhythm game providing apparatus 100 of FIG. 1. Accordingly, even though some descriptions may be omitted below, it may be understood that the descriptions for the components in FIG. 1 are also applied to the flow chart illustrated in FIG. 2.

Referring to FIG. 2, in operation 21, the music signal obtainer 110 in FIG. 1 may obtain a music signal. In operation 22, the main music source extractor 120 in FIG. 1 may analyze the music signal to extract a main sound source. In operation 23, the peak period extractor 130 in FIG. 1 may extract a peak period from the main sound source. In operation 24, the rhythm note designator 140 in FIG. 1 may determine a rhythm note requiring an input (e.g., a tap on the touch screen) from a user to correspond to a timing of the peak period.

Figure 3:
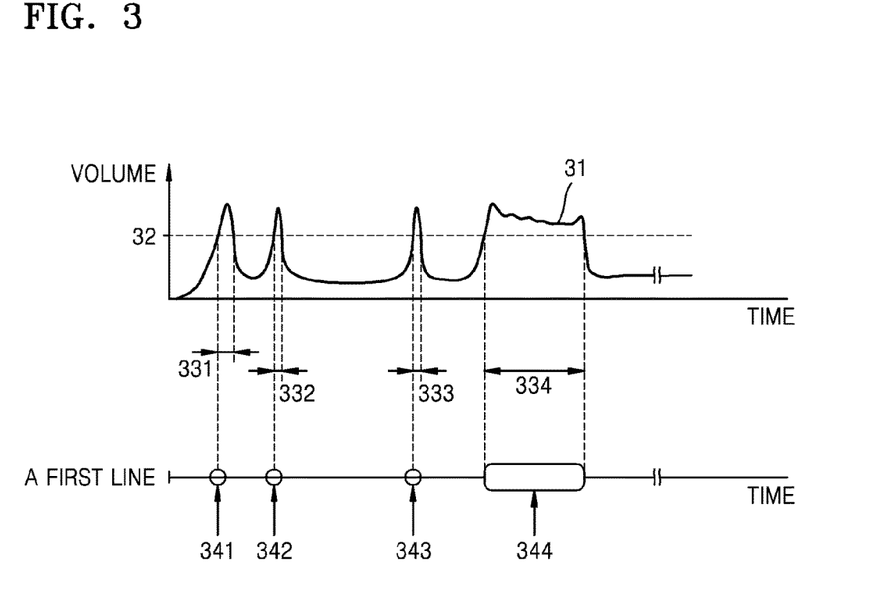
FIG. 3 illustrates an example of a main sound source extracted according to an embodiment and a rhythm note determined to correspond thereto.

FIG. 3 illustrates an example of a main sound source extracted according to an embodiment and a rhythm note determined to correspond thereto.

FIG. 3 illustrates a volume graph of a main sound source 31 and a rhythm note of a first line designated to correspond to the main sound source 31. Referring to FIG. 3, periods that a volume of the main sound source 31 exceeds a desired (or, a alternatively a predetermined) threshold value 32 may be extracted as peak periods 331, 332, 333, and 334. Rhythm notes 341, 342, 343, and 344 may be respectively designated to correspond to the peak periods 331, 332, 333, and 334.

A rhythm note may be designated at a time point when a peak period corresponding to the rhythm note starts. For example, a first rhythm note 341 is designated to correspond to a time point when a first peak period 331 starts. However, embodiments of the inventive concepts are not limited thereto. Alternatively, a rhythm note may be designated at a time point of the highest volume during a peak period.

Referring to FIG. 3, a sustain note may be designated when a length of the peak period exceeds a criterion, otherwise a single note may be designated. For example, a fourth note 344 is designated to correspond to a fourth peak period 334 having a length that exceeds a criterion (e.g., length of peak exceeds a threshold amount of time) and thus, the fourth note 344 is a sustain note. The rhythm notes 341, 342, and 343 respectively designated to correspond to the peak periods 331, 332, and 333 are single notes.

Although only one main sound source is illustrated in FIG. 3, a plurality of sound sources may be extracted as the main sound source, and a rhythm note may be designated taking into account each of the sound sources. For example, when the main sound source includes a vocal sound source and a drum sound source, a rhythm note may be designated to be allocated to both a peak of the vocal sound source and a peak of the drum sound source.

Figure 4:
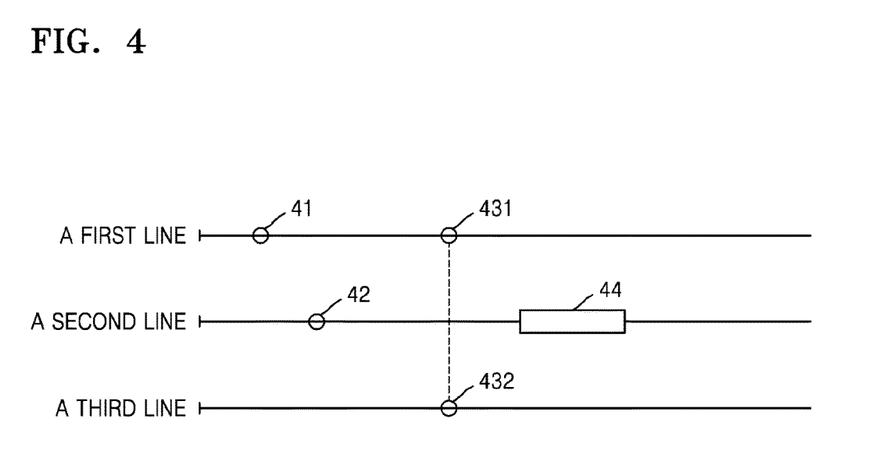
FIG. 4 illustrates an example of a rhythm note according to an embodiment.

FIG. 4 illustrates an example of a rhythm note according to an embodiment.

In FIG. 4, rhythm notes designated to be allocated to a plurality of lines are illustrated. FIG. 4 illustrates a first line, a second line, and a third line, wherein the designated rhythm notes for each of the lines are illustrated.

FIG. 3 illustrates an example in which a rhythm note is designated to be allocated to a single line, but FIG. 4 illustrates an example in which each rhythm note is designated to be allocated to any one of a plurality of lines.

Referring to FIG. 4, a rhythm note may be designated to be allocated to a single line as shown in a case of a first rhythm note 41, a second rhythm note 42, and a fourth rhythm note 44, and a rhythm note may be designated to be allocated to a plurality of lines as shown in a case of third rhythm notes 431 and 432.

Referring to FIG. 4, successive rhythm notes may be designated to be allocated to different lines from each other. Each of the rhythm notes may be designated to be allocated to a line in a desired (or, a alternatively a predetermined) order. Alternatively, each of the rhythm notes may be designated in a random manner.

When a rhythm note of FIG. 4 is randomly designated to correspond to a plurality of sound sources, each of the lines may correspond to the sound sources. For example, when the main sound source includes a vocal sound source and a drum sound source, a rhythm note may be designated to be allocated to the second line and the third line to correspond to a peak period extracted from the vocal sound source while a rhythm note may be designated to be allocated to the first line to correspond to a peak period extracted from the drum sound source. During a period in which peaks of the vocal sound source and the drum sound source overlap, a rhythm note may be designated to be allocated to a plurality of lines. For example, the third rhythm notes 431 and 432 are designated to be allocated to the first line and the third line in FIG. 4.

Figure 5:
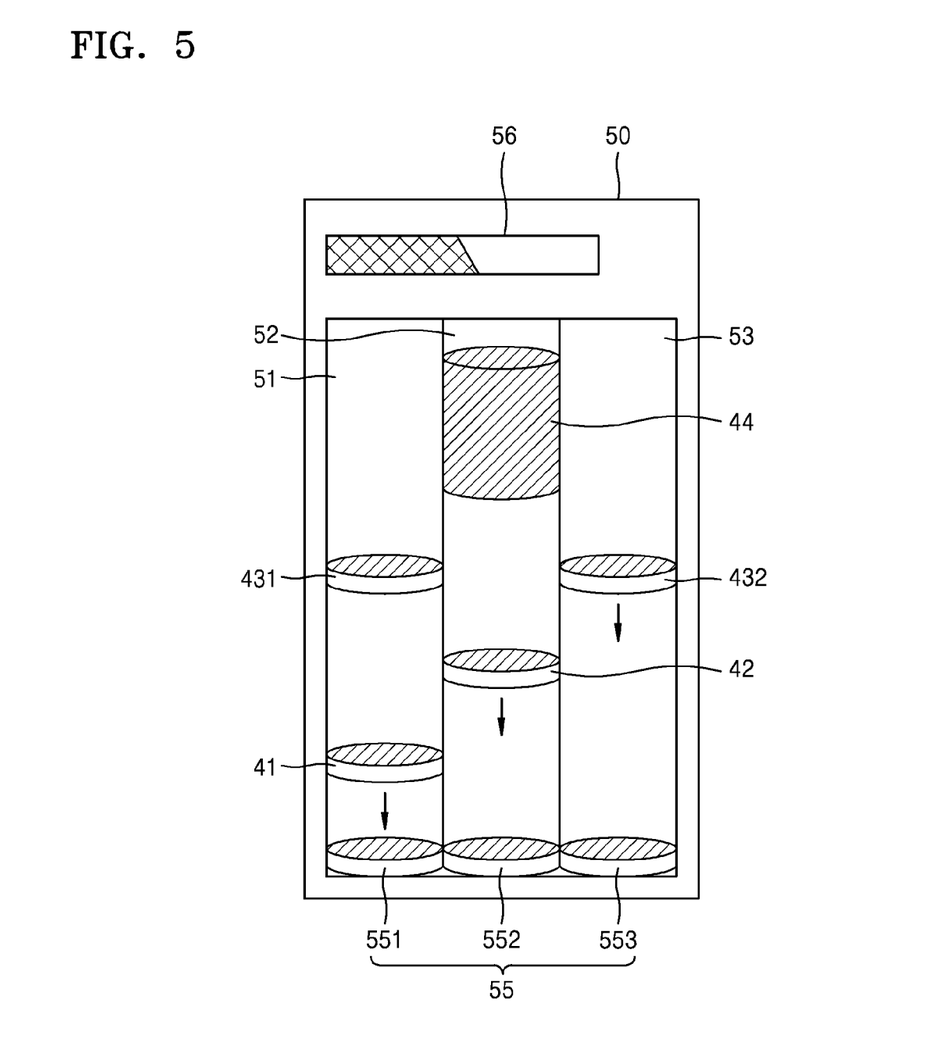
FIG. 5 illustrates an example of a rhythm game screen according to an embodiment.

FIG. 5 illustrates an example of a rhythm game screen according to an embodiment.

FIG. 5 illustrates an example of a screen concurrently displayed on a terminal of a user when reproducing a music signal. On a screen 50 of FIG. 5, the processor 102 displays first to third lines 51, 52, and 53, rhythm notes 41, 42, 431, 432, and 44 designated to correspond to each of the first to third lines 51, 52, and 53, and a pad 55 for receiving a tap input from a user. A score stick 56 for displaying a score may be further displayed on the screen 50 of FIG. 5 by the processor 102.

The pad 55 may be provided to correspond to each of the first to third lines 51, 52, and 53. For example, a first pad 551, a second pad 552, and a third pad 553 may be provided to correspond to the first line 51, the second line 52, and the third line 53 respectively.

A rhythm note displayed on the screen 50 may be displayed to move toward the pad 55 by the processor 102. A rhythm note may arrive at a position of the pad 55 at a timing desired (or, a alternatively a predetermined) for each rhythm note. A user may watch a rhythm note displayed on the screen 50 and input a tap when each rhythm note arrives at the pad 55. According to a tap signal input to the pad 55 when a rhythm note arrives at the pad 55, a score is calculated (e.g., 1 point for each correctly timed tap) by the processor 102. Accumulated score is displayed on a score pad 56.

A user may earn a score by inputting a single tap when single notes 41, 42, 431, and 432 arrive at the pad 55 while a user may earn a score by inputting a long tap to the pad 55 for a period in which the sustain note 44 passes through the pad 55 when a sustain note 44 arrives at the pad 55. The long tap may be maintained from when the sustain note 44 enters to the pad 55 to when the sustain note 44 completely passes through the pad 55. A long tap for a sustain note may be assigned a higher score than a single note.

It should be understood that example embodiments described herein should be considered in a descriptive sense only and not for purposes of limitation. Descriptions of features or aspects within each example embodiment should typically be considered as available for other similar features or aspects in other example embodiments.

While one or more example embodiments have been described with reference to the figures, it will be understood by those of ordinary skill in the art that various changes in form and details may be made therein without departing from the spirit and scope of the inventive concepts as defined by the following claims.

What is claimed is:

1. A method of producing a rhythm game, the method comprising:
   extracting, by at least one processor, a main sound source of a music signal based on a plurality of channel signals included in the music signal;
   extracting, by the at least one processor, a peak period from the main sound source;
   designating, by the at least one processor, a rhythm note that requires a tap input from a user and corresponds to a timing of the peak period;
   editing, by the at least one processor, the rhythm note based on data received from an external source; and
   outputting, by the at least one processor, the rhythm game incorporating the rhythm note,
   wherein,
      the rhythm note includes at least one of a single note requiring a single tap input or a sustain note requiring a long tap input, and
      the designating designates the single note if a length of the peak period is equal to or less than a criterion, and designates the sustain note if the length of the peak period is greater than the criterion.

2. The method of claim 1, wherein the extracting the peak period extracts a period in which a volume of the main sound source exceeds a threshold value as the peak period.

3. The method of claim 1, wherein the main sound source comprises at least one selected from a vocal sound source or a drum sound source.

4. The method of claim 1, wherein
   the music signal is a stereo signal including a left channel signal and a right channel signal,
   the main sound source includes a vocal sound source, and
   the extracting the main sound source extracts the vocal sound source via a center channel extraction method.

5. The method of claim 1, wherein the rhythm note comprises at least one selected from a single note requiring a single tap input, a sustain note requiring a long tap input or a combination thereof, the sustain note having a greater length than the single note.

6. The method of claim 5, wherein the designating designates the sustain note for a peak period when the length of the peak period is greater than a threshold length.

7. The method of claim 5, wherein the designating designates the single note for a peak period when the length of the peak period is less than or equal to a threshold length.

8. The method of claim 1, further comprising:
calculating, by the at least one processor, a number of frequency components of the peak period extracted from the main sound source,
wherein the designating designates a number of single notes corresponding to the number of frequency components.

9. The method of claim 1, further comprising:
obtaining, by the at least one processor, a music signal from a memory or via a network before the extracting the main sound source,
wherein the extracting the main sound source includes extracting the main sound source from the obtained music signal.

10. The method of claim 1, wherein the rhythm note is designated to be allocated to at least one of a plurality of lines and in correspondence with a timing of the peak period.

11. The method of claim 10, wherein the at least one of the plurality of lines is determined based on a desired order.

12. The method of claim 10, wherein the designating designates the rhythm note to be allocated to at least two of the plurality of lines and in correspondence with a timing of the peak period.

13. The method of claim 10, wherein the designating designates the rhythm note to be allocated to different lines and in correspondence with successive peak periods.

14. The method of claim 10, wherein the at least one of the plurality of lines is determined based on a random order.

15. The method of claim 10, wherein the rhythm note is designated to be allocated to at least two of the plurality of lines and in correspondence with a timing of the peak period, the plurality of lines being based on a plurality of sound sources of the music signal including the main sound source and at least one sub sound source.

16. A non-transitory computer readable medium storing instructions that when executed by a computer, cause the computer to perform the method of claim 1.

17. The method of claim 1, wherein the extracting the main sound source extracts a sound source having a highest volume as the main sound source.

18. The method of claim 1, wherein the timing of the peak period corresponds to one of a point where the peak period begins or a highest volume during the peak period.

19. An apparatus for producing a rhythm game, the apparatus comprising:
a memory having computer readable instructions stored thereon; and
at least one processor configured to execute the computer readable instructions to,
extract a main sound source of a music signal based on an analysis of the music signal,
extract a peak period from the main sound source,
designate a rhythm note that requires a tap input from a user and corresponds to a timing of the peak period,
edit the rhythm note based on data received from an external source, and
output the rhythm game incorporating the rhythm note,
wherein,
the rhythm note includes at least one of a single note requiring a single tap input or a sustain note requiring a long tap input, and
the at least one processor is further configured to designate the single note if a length of the peak period is equal to or less than a criterion, and designate the sustain note if the length of the peak period is greater than the criterion.

20. The apparatus of claim 19, wherein the at least one processor is configured to execute the computer readable instructions to further
obtain a music signal stored in a memory or via a network, and
wherein the at least one processor extracts the main sound source from the obtained music signal.

* * * * *